Patented June 2, 1925.

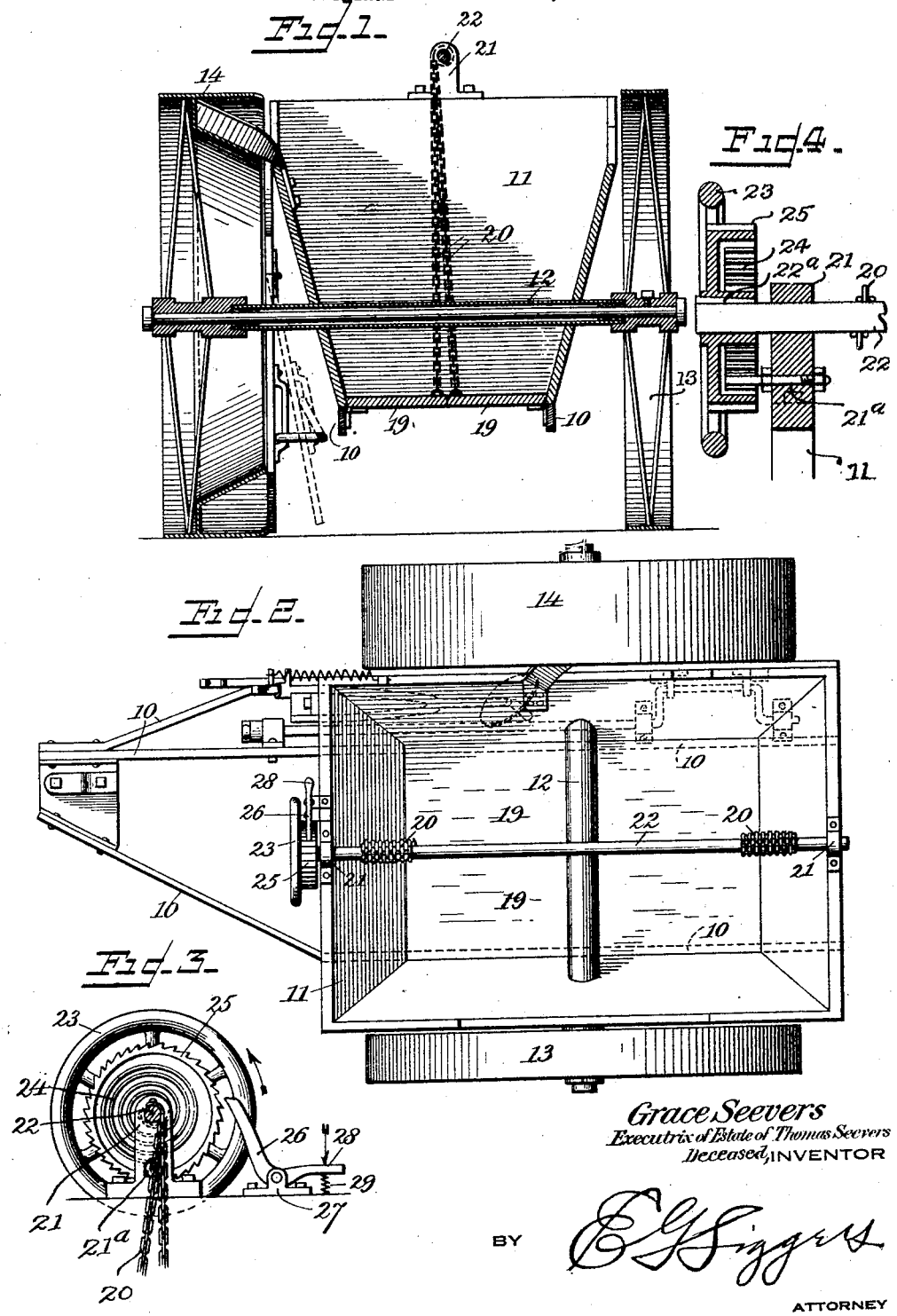

1,539,876

UNITED STATES PATENT OFFICE.

THOMAS SEEVERS, DECEASED, LATE OF OSKALOOSA, IOWA; BY GRACE SEEVERS, EXECUTRIX, OF OSKALOOSA, IOWA.

DUMPING VEHICLE.

Original application filed October 30, 1920, Serial No. 420,717. Divided and this application filed May 16, 1922. Serial No. 561,434.

*To all whom it may concern:*

Be it known that I, GRACE SEEVERS, a citizen of the United States, residing at Oskaloosa, county of Mahaska, State of Iowa, executrix of the estate of THOMAS SEEVERS, late a citizen of the United States, and a resident of Oskaloosa, in the county of Mahaska and State of Iowa, deceased (as by reference to the duly certified copy of letters testamentary on file in the Patent Office, will more fully appear), do hereby declare that the said THOMAS SEEVERS invented a new and useful Improvement in Dumping Vehicles, of which the following is a specification.

This invention relates to dumping vehicles, and particularly to means for dumping the loads thereof.

The objects of the invention are to provide an improved controlling means for the dumping doors of the vehicle, whereby the load will be quickly discharged with a minimum of effort on the part of the operator, and the doors will be automatically closed as soon as the entire load is dumped.

Other objects will be understood from the following detailed description of one preferred embodiment of the invention, shown in the accompanying drawing forming part of this specification.

In the drawing:

Figure 1 is a vertical transverse section through an excavating and dumping cart constructed in accordance with my invention;

Figure 2 is a top plan view of the cart; and

Figure 3 is a detail view on a larger scale, showing the control parts of the dumping mechanism.

Figure 4 is a vertical section of the subject matter of Figure 3.

The present application is a division of a copending application filed by Thomas Seevers, October 30th, 1920, Serial No. 420,717. The claims of the parent case are directed specifically to the excavating and leveling parts of the machine. In the accompanying drawing only so much of the machine is shown as is helpful to an understanding of this invention.

Referring in more detail to the illustrative embodiment of the invention depicted in the drawing, there is shown a frame 10 and a hopper or body 11 on the frame, said hopper open at the top and having converging sides so that its bottom is of smaller area than the top. Passing through the hopper is a sleeve 12 enclosing an axle; and a wheel 13 is revolvably mounted on one end of the axle, while a conveyor wheel 14 is made fast to the opposite axle end. The two wheels 13, 14 support and permit ready turning of the vehicle.

The bottom of the hopper 11 is closed by hinged doors 19 opening downwardly. Said doors are maintained in closed position by chains 20 secured to a shaft 22 mounted in brackets 21 and extending longitudinally of the machine above the hopper. As the shaft is rotated by means to be described, the chains 20 will be wrapped about the shaft, thus bringing the doors 19 to closed position, or else they will be unwrapped therefrom, whereupon the doors will swing outwardly to dump the material.

The forward end of the shaft 22 mounts a hand wheel 23, secured thereto by means of a key 22[a], which causes the hand wheel and the shaft to rotate together. A spring 24 similar to a clock spring is secured at one end to the shaft 22 and is housed within a recess provided on a ratchet disk 25 on wheel 23 and has its outer end secured to a pin 21[a], which is secured to the front bracket 21 beneath the shaft 22 and projects forwardly to extend into the said recess of the ratchet wheel, as clearly shown in Figure 4 of the drawing. A pawl 26 is pivotally mounted upon the hopper, as indicated at 27, and has a handle 28 normally maintained in raised position by a coil spring 29. The spring 29 tends to maintain the pawl in engagement with the teeth of the ratchet disk. The spring 24 tends to move the shaft 22 in such direction that the doors 19 are elevated to closed position by the winding of the chains 20 thereon, the expansive force of the spring causing the shaft and wheel to turn in the direction indicated by the arrow in Fig. 3, wherein the parts are shown with the pawl 26 held in depressed position while the doors 19 are moving downwardly under the load to dump, and causing the spring to be placed under tension. The dumping of the load winds up the spring 24, said dumping being allowed to take place only when the pawl is swung out of engagement with the ratchet disk. After the load is dumped, the tension of the spring returns the doors to closed position and the pawl, being spring-pressed against the ratchet, holds the disk and hence the shaft 22 in the necessary position so that more excavated material may be conveyed into the cart and held therein until the time for the next dumping occurs.

When the operator desires to dump a load, it is only necessary to depress the handle 28 of pawl 26, whereupon the weight of the material in the hopper will cause the doors 19 to swing downwardly and outwardly. As soon, however, as all the material has dropped, the spiral spring 24, which was wound up by the downward movement of the doors, will return the doors to closed position, and this return movement will take place automatically and without attention on the part of the operator. The hand wheel 23 permits the operator to lighten the tension of the spiral spring by giving added turns to the latter after the doors are in closed position.

The invention provides a simple but efficient means for controlling the dumping of loads from a vehicle of any description and the preferred means shown in the drawing is not only easy to operate but is readily installed upon dumping carts and dumping cars of widely varying types.

Having described one embodiment of the invention, what is claimed is:—

1. A dumping device comprising a hopper, a longitudinal shaft rotatably mounted on the hopper, a dumping door for the hopper, a chain connecting the door to the shaft, said chain wrapping on the shaft, a hand wheel splined on the shaft and having a ratchet wheel carried thereby and turning therewith, a pawl pivoted on the hopper and engaging the ratchet wheel to maintain the door closed, and a spiral spring surrounding the shaft with one end connected to the latter and the other to a stationary part for rewinding the chain on the shaft after the pawl has been released and the door is opened by the weight of the load, said spring being placed under tension when the door is opened, whereby the door automatically closes following the dumping of the load, said hand wheel being operable to control the tension of the spring after the door is closed.

2. In a machine of the class described, a hopped, oppositely swinging dumping doors hinged to the bottom of the hopper, alined bearings mounted on the upper edges of the ends of the hopper, a longitudinal shaft mounted to revolve therein, front and rear chains connected to the doors and wound upon the shaft, a hand wheel keyed to one end of the shaft, a ratchet wheel connected to the hand wheel, a pawl mounted on the hopper to engage the ratchet wheel and hold the doors elevated to receive and support a load when the chains are wound upon the shaft, and a spiral spring having its inner end connected to the shaft and its outer end to a stationary part to revolve the shaft, wind up the chains and close the doors after the pawl has been released and the load is dumped, said spring being rewound when the doors are swung open under the weight of the load, and said hand wheel being operable to control the tension of the spring after the doors are closed.

In testimony, that I claim the foregoing as the invention of THOMAS SEEVERS, deceased, I have hereto affixed my signature.

GRACE SEEVERS,
*Executrix of the estate of Thomas Seevers, deceased.*